(No Model.)
A. H. EMERY.
CONSTRUCTION OF SCREW THREADED LINKS, BARS, OR BOLTS.
No. 322,052. Patented July 14, 1885.
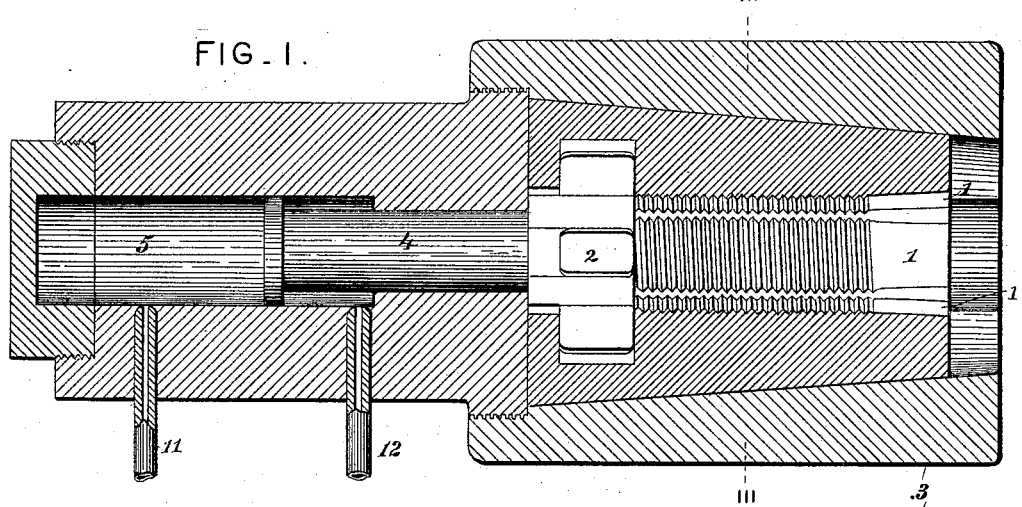
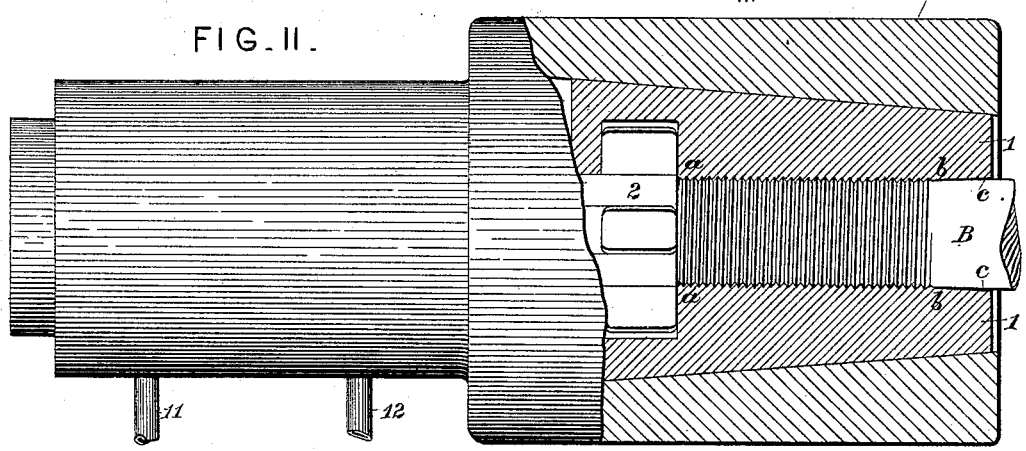
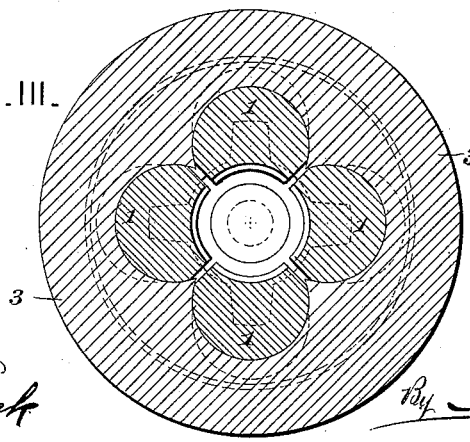

UNITED STATES PATENT OFFICE.

ALBERT H. EMERY, OF STAMFORD, CONNECTICUT.

CONSTRUCTION OF SCREW-THREADED LINKS, BARS, OR BOLTS.

SPECIFICATION forming part of Letters Patent No. 322,052, dated July 14, 1885.

Application filed July 29, 1884. (No model.)

*To all whom it may concern:*

Be it known that I, ALBERT HAMILTON EMERY, a citizen of the United States, residing at Stamford, in the county of Fairfield and State of Connecticut, have invented certain new and useful Improvements in the Construction of Screw-Threaded Links, Bars, or Bolts, of which the following is a specification.

My invention relates to the construction of bars, links, or bolts which are formed at their ends with screw-threads for coupling or connecting them together or to other members of structures of which they are to form a part. The object of my invention is to so construct such screw links, bars, or bolts that the ends on which the screw-threads are formed will, without any great increase, and preferably without any increase, of size, possess a tensile strength fully equal to that of the body of the link, bar, or bolt. It is manifest that if a link, bar, or bolt made of equal diameter and of equal tensile strength from end to end have a screw-thread formed on its end by the ordinary cutting or chasing process, for the reception of a coupling sleeve or nut, such threaded portion of the link, bar, or bolt will be weakened to the extent of its greatest reduction in cross-section in the cutting of the threads; and, further than this, a serious cause of weakness exists from the fact that the entering angles of the screw-threads form definite lines or planes of fracture or points where fracture is invited. Attempts have been made to overcome these difficulties by upsetting the ends of rods or bars which are to be screw-threaded, such upsetting being performed by hot swaging or pressing, resulting in radial expansion and increase in diameter of the bar or rod, and the subsequent formation of screw-threads on these enlarged ends. By this mode of threading a portion of the bar which is of greater diameter than the body, the screw-threaded portion itself may be increased in strength; but in threaded bars of this construction a definite plane or section of minimum strength exists at that point where the enlarged shoulder runs into the body of the bar, not only because the formation of the shoulder itself defines a line or section of fracture, but still more because of the violence and distortion to which the fibers are subjected at this point in the operation of upsetting.

A further manifest objection to the enlarged ends of rods or bars exists from the fact that such enlarged ends necessitate the use of coupling sleeves or nuts of larger diameter than would be demanded by the size of the bar or bolt itself.

To obviate these difficulties I have devised a mode of treatment by which increased tensile strength is imparted to that portion of a bar or bolt on which a screw-thread is formed or to be formed without any great increase in diameter or section, and by which the maximum tensile strength extends throughout the length of the threaded portion of the bar or bolt, and thence gradually decreases until the normal tensile strength is reached at that portion of the bar or bolt which has not been treated, by which means I avoid the formation of any defined line or section of easy fracture and give to the threaded portion of the bar or rod, with little or no increase in diameter, a tensile strength superior to that of the body or main portion of the bar. The desired result is effected by condensing the ends of the bar, rod, or bolt by the application thereto of very heavy pressure while it is in a cold or moderately-heated state, by which expression I mean that the metal should be cold and must not in any event be heated to a sufficient extent to impart free ductility or permit it to flow easily under the pressure, as in the ordinary process of forging or swaging.

By local cold compression and consequent condensation of the metal I impart increased tensile strength thereto at and near the screw-threaded portion, while the untreated body of the bar or bolt may be left in its original condition as to strength and ductility.

Without desiring to limit myself to particular machinery for carrying my invention into effect, I will state that it may be advantageously carried out by the use of compression-dies threaded on their inner faces so as to form the desired screw-threads on the bar or rod during the operation of cold-compressing.

In the accompanying drawings, Figure I is a longitudinal section of a set of suitable dies. Fig. II is a sectional elevation of the same, showing the end of a bolt or rod undergoing cold-compression between them. Fig. III is a transverse section of the dies on the line III III, Fig. I.

1 1 represent any desirable number of concave-faced dies having cylindrical backs converging longitudinally and fitted to slide in corresponding converging cylindrical seats within a sleeve or housing, 3. The dies 1 are connected by a cruciform head, 2, the arms of which engage in recesses near the heels of the dies, so as to compel them to move in unison. The inner faces of the dies are screw-threaded, as shown in Fig. I, in order to produce the desired screw-thread on the bar or bolt B in the operation of condensing the metal by pressure applied while the said bar or bolt is in a cold or moderately heated state, as already explained. The radial pressure of the dies is produced by their longitudinal movement within their converging sleeve or housing 3, which longitudinal movement may be imparted by a ram or plunger, 4, working in a cylinder, 5, from which pipes 11 12 connect with suitable pumps.

In order to produce the effect, hereinbefore explained, of imparting a maximum tensile strength to the bar or rod throughout the length of its threaded portion and beyond this into the body, and cause the tensile strength gradually to diminish to a point where it becomes normal, the dies 1, by which the ends of the bars, rods, or bolts are condensed by compression while cold or in a slightly heated state, are formed in their central portions with parallel faces—from a to b, for example—extending throughout the length of the screw-thread and to a sufficient distance beyond it to prevent the formation of a defined plane of possible fracture at the point where the screw-thread runs into the body of the bar. From b to c the faces of the dies are inclined away from one another very slightly, (and to an extent which in practice may be imperceptible to the eye, but which in the drawings is exaggerated for the purpose of illustration,) so as to cause a gradual reduction in the force of compression and the consequent condensation of the metal from the point b to the main body of the bar, where the strength is normal; but in carrying out my invention I prefer further to provide between points b and c a zone of pressure in the dies, which, without imparting any considerable condensation to the metal, will serve to clamp the bar or bolt so as to prevent the outward or endwise flow of the metal under the pressure of the dies.

In order to prevent the formation of fins on the threaded bar or bolt by the action of the divided dies, the pressure of the dies is relaxed and the bar or bolt turned partly on its axis two or three times during the operation.

If preferred, the screw-threads may be partially formed by chasing or cutting before the operation of compression between dies; or the cold-compression may be performed by smooth-faced dies, and the screw-threads may be chased or cut in the condensed metal at a subsequent operation. The radial motion of the dies in compressing the metal is but very slight; hence my invention may be effectually carried out by partially forming the threads by chasing or by preliminary pressure between dies while the metal is either hot or cold, and subsequently, when the metal is cold, compressing it and finishing the threads by means of dies, as herein represented and described, which, by reason of the slight radial motion of the dies required in cold-compressing the metal and completing the threads, may be set very close together, the space between them being insufficient to permit the radial flow of metal and the consequent formation of projecting fins to any considerable extent. In thus condensing the threaded ends the main portion of the bar, rod, or bolt is left in its original ductile state, so that it may bend and otherwise accommodate itself to its position in service, while the threaded ends are strengthened so as to obviate the danger of breaking through the threads.

If the threaded portion of the bar only were compressed, the termination of the compressed and condensed portion at the end of the thread would make a defined point of fracture; hence the heavy pressure is extended beyond the threaded portion into the body of the bar, and gradually diminished till the untreated portion of the body is reached. The result of this treatment is that when such a bar is subjected to a strain the untreated portion having a lower limit of elasticity will be the first to yield, while the threaded portion and that immediately adjoining it will be relieved of injurious strain.

I do not claim forming screw-threads by swaging; neither do I claim cold-pressing bars or tubes as broadly new.

Where screw-threads are produced by rolling or swaging, any such compression as there may be abruptly terminating with the screw-thread, it is manifest that a weak line is produced at the junction of the screw-thread and the body of the rod or bolt; and it is also true that in the threaded portion of the bar or bolt the production of screw-threads by swaging or rolling, as now practiced, even if this should be done in cold metal, does not produce an effective compression and condensation of the metal throughout the entire body, as in my mode of cold compressing and condensing in dies of suitable form, as hereinbefore described.

Having thus described my invention, what I claim as new therein, and desire to secure by Letters Patent, is—

The mode or process of increasing the strength of screw-rods, bars, or bolts, the same consisting in compressing the metal while cold, or nearly so, so as to condense it to a maximum extent throughout the length of the screw-thread and beyond this into the body of the bar or rod, and thence in a gradually-reduced degree to a point where the normal tensile strength is reached in the untreated portion or body of the bar or bolt.

ALBERT H. EMERY.

Witnesses:
OCTAVIUS KNIGHT,
A. E. TRUMBULL.